United States Patent Office 3,663,471
Patented May 16, 1972

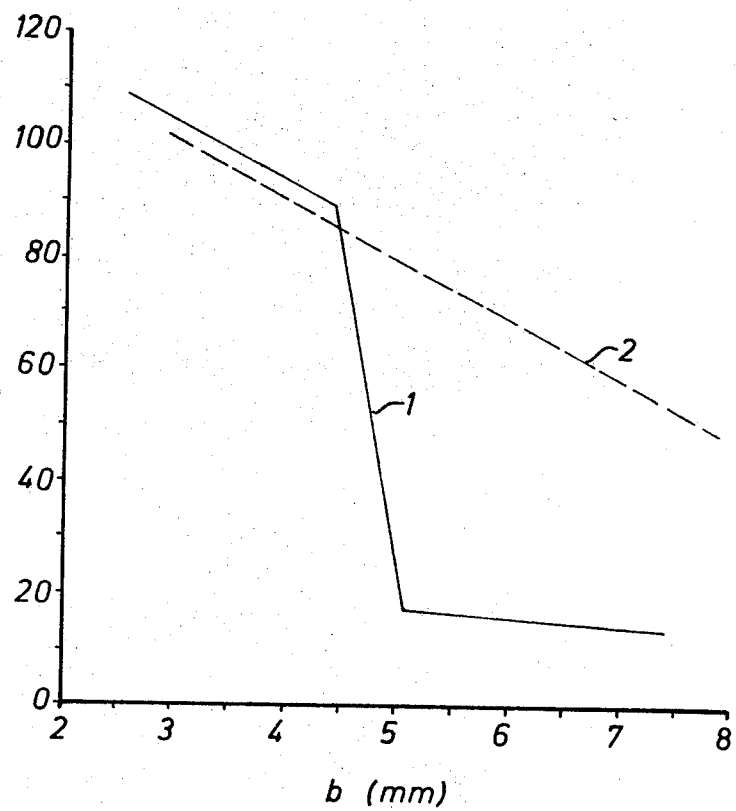

3,663,471
THERMOPLASTIC MOLDING COMPOSITIONS AND MOLDINGS OF POLYCARBONATES ADMIXED WITH A GRAFT COPOLYMER
Hermann Schirmer, Krefeld, Gunter Peilstocker, Krefeld-Bockum, and Hugo Vernaleken, Krefeld, Germany, assignors to Farbenfabriken Bayer Aktiengesellschaft, Leverkusen, Germany
Filed Jan. 2, 1970, Ser. No. 343
Claims priority, application Germany, Jan. 8, 1969, P 19 00 756.8
Int. Cl. C08f 15/00; C08g 39/00, 51/04, 57/14
U.S. Cl. 260—40                                   6 Claims

ABSTRACT OF THE DISCLOSURE

The invention relates to thermoplastic moulding compositions and mouldings of polycarbonates of dihydric phenols having improved properties containing particular amounts of particular graft polymers admixed to the polycarbonates. The particular graft polymers are manufactured from about 50 to about 90% by weight of polybutadiene and a mixture of about 5 to about 40% by weight of acrylonitrile and about 5 to about 45% by weight of an aromatic vinyl hydrocarbon, such as styrene, and said graft polymers are present in an amount of about 0.5 to about 9.5 parts by weight for about 99.5 to about 90.5 parts by weight of polycarbonate.

---

The invention relates to thermoplastic moulding compositions of polycarbonates of dihydric phenols with a particular content of particular polymerisation products.

It is known to modify the properties, especially the thermoplasticity, of polycarbonates of aromatic dihydroxy compounds by admixing polymerisation products, especially graft polymers, which are manufactured from polybutadiene and a mixture of acrylonitrile and an aromatic vinyl hydrocarbon (compare, for example, German displaced specification 1,170,141). As suitable graft polymers, this displaced specification mentions those containing 30 to 45% by weight of polybutadiene, 15 to 25% by weight of acrylonitrile and 40 to 45% by weight of styrene, which are mixed in amounts of 10 to 70 parts by weight with 90 to 30 parts by weight of polycarbonate. Apart from the melt index, however, the tensile strength, the elongation and the heat distortion temperature of this mixture for example also change with increasing content of graft polymer, and this is in no way desirable for many end uses of the mixtures, for example as injection moulding compositions.

Now the object of the invention are thermoplastic moulding compositions and mouldings comprising mixtures of polycarbonates of dihydric phenols with graft polymers which are manufactured from about 50 to about 90% by weight of polybutadiene and a mixture of about 5 to about 40% by weight of acrylonitrile and about 5 to about 45% by weight of an aromatic vinyl hydrocarbon, said graft polymers being present in the moulding compositions or mouldings in an amount of from about 0.5 to about 9.5 parts by weight for about 99.5 to about 90.5 parts by weight of polycarbonate. Optionally they may contain also pigments and the mouldings may be heat-treated where appropriate.

These moulding compositions and mouldings have a hardly perceptibly modified thermoplasticity in comparison to those consisting only of the corresponding polycarbonates, but on the other hand have, in part, distinctly improved mechanical properties, such as tensile strength, heat distortion temperature and Martens point, especially if they have been heat-treated. The most important advantage however consists in a significantly improved notched impact strength of the mouldings, in particular as follows:

Mouldings of known polycarbonates admittedly possess a notably high notched impact strength, but only up to a limited wall thickness. If this wall thickness is exceeded, the notched impact strength values abruptly decline very rapidly down to about 1/5. The tough fracture which occurs at low wall thicknesses abruptly changes to a brittle fracture at the critical wall thickness or thickness. This critical thickness is further lowered by a content of pigments, as is shown by Table 1 below:

TABLE 1

Critical thickness as a function of pigment content

| Titanium dioxide content (percent by weight): | Critical thickness in mm. |
|---|---|
| 0 | 5.2 |
| 1 | 3.7 |
| 2 | 2.7 |

Furthermore, the prolonged action of higher temperatures on pigmented polycarbonates yet further lowers the critical thickness.

More exact data as to this behaviour can be found in the book by Christopher and Fox "Polycarbonates," Reinhold Plastics Application Series, pps. 50 to 51.

Now in the mouldings according to the invention, characterised above, this abrupt steep drop in the notched impact strength does not occur on exceeding a certain thickness; rather, the notched impact strength values only decline slowly and steadily as the thickness of the moulding increases (see the drawing in conjunction with Example 2).

If the content of polybutadiene in the graft polymer mixed into the polycarbonate is less than about 50% by weight, it requires larger amounts than about 9.5% by weight of such a graft polymer for the critical thickness to disappear and the notched impact strength to decline steadily as a function of the thickness of the moulding. At a higher content of graft polymer in the mixtures the deterioration of certain mechanical properties of the mouldings, which has already been mentioned, however occurs.

High molecular thermoplastic polycarbonates of dihydric phenols in the sense of the invention are the known polycarbonates which are manufactured from dihydric phenols, such as resorcinol, hydroquinone, dihydroxydiphenylene and especially bis-(hydroxyphenyl)-alkanes, halogenated bis-(hydroxyphenyl)-alkanes, such as 4,4'-dihydroxy-3,5,3',5'-tetrachlorodiphenylpropane or 4,4'-dihydroxy-3,5,3',5'-tetrabromodiphenylpropane, bis-(hydroxyphenyl)-cycloalkanes, -sulphones, -sulphoxides, -ethers and -sulphides, optionally mixed with glycols, with carbonic acid derivatives, such as diesters and dihalides, optionally with the conjoint use of minor amounts of dicarboxylic acids or their ester-forming derivatives, and which possess an average molecular weight of at least about 10,000, preferably between about 25,000 and about 200,000.

By aromatic vinyl hydrocarbons which are used for the manufacture of the graft polymers there are to be understood styrene and its homologues, for example methylstyrene.

The manufacture of the graft polymers can be carried out in a known manner, such as for example described in German displayed specification 1,170,141.

Apart from pigments, the mixtures can optionally also contain dyestuffs, stabilisers, lubricants and mould release agents, and fillers, for example glass fibres.

EXAMPLE 1

1 part by weight of titanium dioxide pigment and 4 parts by weight of a graft polymer of a mixture of 15 parts by weight of acrylonitrile, 35 parts by weight of styrene and 50 parts by weight of polybutadiene latex are incorporated by means of an extruder, at 270° C., into the melt of 95 parts by weight of polycarbonate manufactured in the usual manner from bisphenol A and phosgene, having a relative viscosity of 1.28 measured on an 0.5% by weight solution in methylene chloride at 25° C. A brilliant white-pigmented polycarbonate is obtained, the properties of which can be seen from Table 2. If the notched impact strength of this material is measured according to ASTM D 256 as a function of the sample thickness, there is no steep drop. At 7.5 mm. thickness the notched impact strength is still 98 cm. kg./cm.$^2$ (according to Izod). The notched impact strength at low temperatures is also good.

EXAMPLE 2

1 part by weight of Cadmopur Red BN (cadmium red) and 4 parts by weight of the graft polymer are incorporated, as described in Example 1, by means of an extruder, at 270° C., into the melt of 95 parts by weight of polycarbonate manufactured in the usual manner from bisphenol A and phosgene. The properties can be seen from Table 3.

If the notched impact strength according to Izod ASTM D 256 is measured on the pigmented polycarbonate and on the pigmented polycarbonate containing the graft polymer as a function of the sample thickness, it is seen that in the case of the pigmented polycarbonate without graft polymer the notched impact strength declines steeply at about 4.5 mm. thickness from about 80 cm. kp./cm.$^2$ to about 20 cm. kp./cm.$^2$ (curve 1 of the drawing). Against this, in the case of the pigmented mixture of the polycarbonate and the graft polymer, the notched impact strength declines very gradually from about 100 cm. kp./cm.$^2$ at about 3 mm. sample thickness to about 50 cm. kp./cm.$^2$ at about 8 mm. sample thickness (curve 2 of the drawing).

TABLE 2

|  | Test specification | Polycarbonate, 100% | Mixture [1] | Heat-treated for 400 hours at 130° C.[1] |
|---|---|---|---|---|
| Impact strength, cm. kp./cm.$^2$ | DIN 53,453 | ([2]) | ([2]) | ([2]) |
| Notched impact strength,[3] cm. kp./cm.$^2$ | DIN 53,454 | 59 | 56 | 5 |
| Martens point, ° C | DIN 53,458 | 108 | 99 | 149 |
| Heat distortion temperature, ° C., 0.25 mm. | ASTM D 648 | 135 | 131 | 150 |
| Tensile stress, elastic limit, kp./cm.$^2$ | DIN 53,455 | 618 | 585 | 763 |
| Elongation, elastic limit, percent. | DIN 53,455 | 6.8 | 6.5 | 6.7 |

[1] 95 parts by weight of polycarbonate, 4 parts by weight of graft polymer and 1 part by weight of TiO$_2$ white pigment.
[2] Not broken.
[3] The measurement of the notched impact strength according to DIN 53,453 is carried out on the small rod: 50 x 6 x 4 mm.

TABLE 3

|  | Test specification | Mixture of 99 parts [1] | Mixture of 95 parts [2] |
|---|---|---|---|
| Impact strength, cm. kp./cm.$^2$ | DIN 53,453 | ([3]) | ([3]) |
| Notched impact strength,[4] cm. kp./cm.$^2$ | DIN 53,453 | 25 | 50 |
| Tensile stress, elastic limit, kp./cm.$^2$ | DIN 53,455 | 590 | 600 |
| Breaking strength B, kp./cm.$^2$ | DIN 53,455 | 780 | 770 |
| Elongation at break B, percent | DIN 53,455 | 105 | 100 |
| Martens point, ° C | DIN 53,458 | 108 | 100 |
| Heat distortion temperature, ° C., 0.25 mm. | ASTM D 648 | 135 | 125 |
| Heat distortion temperature, ° C., 0.33 mm. | ASTM D 648 | 139 | 130 |

[1] By weight of polycarbonate and 1 part by weight of Cadmopur Red BN (cadmium red).
[2] By weight of polycarbonate, 4 parts by weight of graft polymer and 1 part by weight of Cadmopur Red BN (cadmium red).
[3] Not broken.
[4] The measurement of the notched impact strength according to DIN 53,453 is carried out on the small rod: 50 x 6 x 4 mm.

We claim:
1. Thermoplastic moulding compositions comprising mixtures of polycarbonates of dihydric phenols, said polycarbonates having a molecular weight of at least about 10,000, with graft polymers which are manufactured from about 50 to about 90% by weight of polybutadiene and a mixture of about 5 to about 40% by weight of acrylonitrile and about 5 to about 45% by weight of styrene or methyl styrene, said graft polymers being present in the moulding compositions or mouldings in an amount of from about 0.5 to about 9.5 parts by weight for about 99.5 to about 90.5 parts by weight of polycarbonate.

2. Thermoplastic moulding compositions according to claim 1 containing titanium dioxide or [Cadmopur Red BN] cadmium red.

3. The thermoplastic molding composition of claim 1 in which the dihydric phenol is resorcinol, hydroquinone, dihydroxydiphenylene, a bis(hydroxyphenyl)alkane, a halogenated bis(hydroxyphenyl)alkane, a bis(hydroxyphenyl)cycloalkane, a bis(hydroxyphenyl)sulphone, a bis(hydroxyphenyl)sulphoxide, a bis(hydroxyphenyl)ether or a bis(hydroxyphenyl)sulphide.

4. Thermoplastic mouldings of the moulding composition of claim 1.

5. Mouldings according to claim 4 being heat-treated.

6. The thermoplastic moldings of claim 5 which are heat treated at temperatures of up to 130° C. for up to 400 hours.

References Cited
UNITED STATES PATENTS
3,130,177    4/1964    Grabowski _____ 260—873

WILLIAM H. SHORT, Primary Examiner
E. WOODBERRY, Assistant Examiner

U.S. Cl. X.R.
260—873, 876